United States Patent
Hong et al.

(10) Patent No.: US 9,204,487 B2
(45) Date of Patent: *Dec. 1, 2015

(54) EFFICIENT OPERATIONS OF COMPONENTS IN A WIRELESS COMMUNICATIONS DEVICE

(75) Inventors: Danfeng Hong, Calgary (CA); Jose Guterman, Calgary (CA); Chris Hills, Calgary (CA)

(73) Assignee: Micron Technology, Inc., Boise, ID (US)

( * ) Notice: Subject to any disclaimer, the term of this patent is extended or adjusted under 35 U.S.C. 154(b) by 250 days.

This patent is subject to a terminal disclaimer.

(21) Appl. No.: 13/615,995

(22) Filed: Sep. 14, 2012

(65) Prior Publication Data

US 2013/0007775 A1 Jan. 3, 2013

Related U.S. Application Data

(63) Continuation of application No. 11/024,956, filed on Dec. 29, 2004, now Pat. No. 8,307,377.

(51) Int. Cl.
*H04W 88/00* (2009.01)
*G06F 9/54* (2006.01)

(52) U.S. Cl.
CPC ............... *H04W 88/00* (2013.01); *G06F 9/541* (2013.01)

(58) Field of Classification Search
CPC ................................. G06F 9/541; H04W 88/00
See application file for complete search history.

(56) References Cited

U.S. PATENT DOCUMENTS

| | | | |
|---|---|---|---|
| 6,128,509 A | 10/2000 | Veijola et al. | |
| 6,389,129 B1 | 5/2002 | Cowan | |
| 6,804,516 B2 | 10/2004 | Choi | |
| 6,996,409 B2 | 2/2006 | Gopinath et al. | |
| 7,664,838 B2 | 2/2010 | Monga et al. | |
| 2002/0112055 A1 | 8/2002 | Capers et al. | |
| 2002/0183032 A1 | 12/2002 | Fang | |
| 2003/0208637 A1* | 11/2003 | Hayduk | 709/320 |
| 2004/0131078 A1* | 7/2004 | Gupta et al. | 370/466 |
| 2004/0259547 A1 | 12/2004 | Lau et al. | |
| 2005/0198304 A1 | 9/2005 | Oliver et al. | |
| 2005/0251558 A1 | 11/2005 | Zaki | |
| 2006/0161688 A1 | 7/2006 | Hong et al. | |

* cited by examiner

*Primary Examiner* — Charles E Anya
(74) *Attorney, Agent, or Firm* — Schwegman Lundberg & Woessner, P.A.

(57) ABSTRACT

Various embodiments comprise apparatuses and methods including a communications subsystem having an interface module and a protocol module with the communications subsystem being configured to be coupled to an antenna. An applications subsystem includes a software applications module and an abstraction module. The software applications module is to execute an operating system and user applications; the abstraction module is to provide an interface with the software applications module. A controller interface module is coupled to the abstraction module and the interface module and is to convert signals from the applications subsystem into signals that are executable by the communications subsystem. Additional apparatuses and methods are described.

16 Claims, 9 Drawing Sheets

EFFICIENT OPERATIONS OF COMPONENTS IN A WIRELESS COMMUNICATIONS DEVICE

PRIORITY APPLICATION

This application is a continuation of U.S. application Ser. No. 11/024,956, filed Dec. 29, 2004, now U.S. Pat. No. 8,307,377 which is incorporated herein by reference in its entirety.

TECHNICAL FIELD

Various embodiments described herein relate to wireless devices generally and more particularly to systems and methods for improved communications between components in a wireless communications device.

BACKGROUND

More and more, consumers are using wireless devices to remain connected to the world around them. Cell phone users can retrieve movie listings while traveling to the theater. Ubiquitous connectivity without regard to physical location has become a reality. One of the results of this new reality is that consumers demand more functions from their cell phones than ever before. Picture and video phones are two examples of the myriad functionalities being built into today's cell phones. The rapid pace of progress places a demand on the manufacturers to continuously update software to enable diverse functions. Upgrades affect many aspects of that device's software instructions.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

In the following detailed description of embodiments of the invention, reference is made to the accompanying drawings which form a part hereof, and in which is shown by way of illustration specific preferred embodiments in which the subject matter may be practiced. These embodiments are described in sufficient detail to enable those skilled in the art to practice them, and it is to be understood that other embodiments may be utilized and that logical, mechanical, and electrical changes may be made without departing from the spirit and scope of the present disclosure. Such embodiments of the inventive subject matter may be referred to, individually and/or collectively, herein by the term "invention" merely for convenience and without intending to voluntarily limit the scope of this application to any single invention or inventive concept if more than one is in fact disclosed. The following detailed description is, therefore, not to be taken in a limiting sense, and the scope of the present disclosure is defined only by the appended claims.

Figure 1:
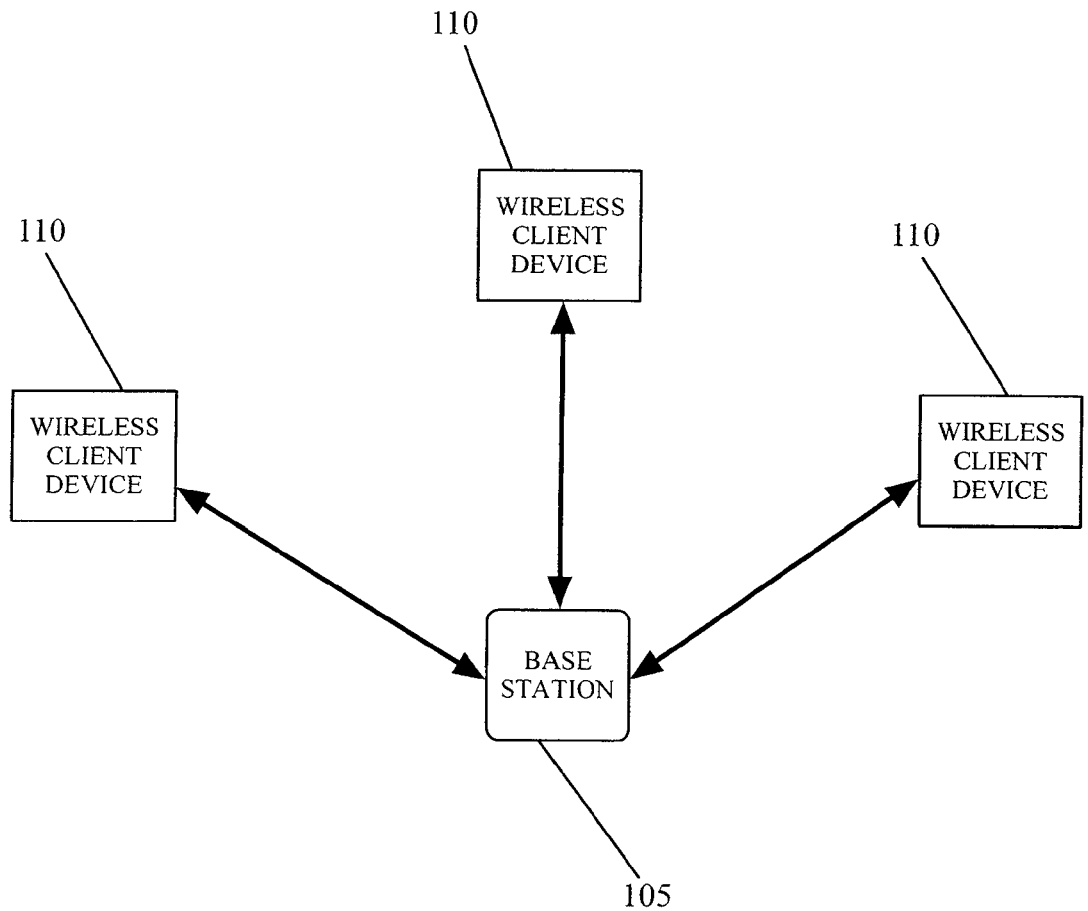
FIG. 1 is a high-level block diagram of a network of wireless client devices according to embodiments of the present invention.

FIG. 1 is a high-level block diagram of a network of wireless client devices according to embodiments of the present invention. In an embodiment, a base station 105 provides wireless connectivity to a plurality of wireless client devices 110. Connectivity includes transmitting wireless signals to and receiving wireless signals from the plurality of wireless client devices 110. Wireless data signals may include, without limitation: Global System for Mobile Communications (GSM); General Packet Radio Service (GPRS); Code Division Multiple Access (CDMA); Time Division Multiple Access (TDMA); IEEE 802.11 standard signals, IEEE std. 802.11-1999, published 1999 and later versions (hereinafter IEEE 802.11 standard); IEEE 802.16 standard signals, IEEE std. 802.16-2001, published 2001 and later versions (hereinafter IEEE 802.16 standard); Wide Band CDMA (WCDMA); High Speed Downlink Packet Access (HSDPA); or Ultra WideBand (UWB). Though specific types of wireless signals are listed, for the embodiments herein it is to be appreciated that any signal that passes between two devices without a wire is considered to be a wireless signal.

In an embodiment, the base station 105 is any device that is capable of transmitting and receiving wireless signals from at least one wireless client device 110 and providing a connection to a suitable network 115. In an embodiment, the base station 105 comprises a radio-frequency (RF) transmitter and receiver and a network interface. Though reference is made to RF, it is to be appreciated that other types of wireless signals may be communicated between the access point 105 and the wireless client device 110, such as, infrared signals, microwave signals and the like. The access point 105 may be connected to any suitable network, such as the internet or a private network.

In a further embodiment, the base station 105 may alternatively be called an access point. In another embodiment, there may be more than one base station 105 providing a wireless network to any number of wireless client devices 110, and that the suitable network in such a case may be a connection with a further base station 105, which is either connected to a suitable network or further connected to other base stations 105.

In an embodiment, the wireless client device 110 provides a user the ability to wirelessly connect to a suitable network, such as the internet or a private network. The wireless client device 110 may include, without limitation, a cellular telephone, a personal digital assistant (PDA), a laptop computer, a desktop computer, an internet appliance or any device capable of receiving and/or transmitting wireless data signals to another device. Though the transmission between the wireless client device 110 and the base station 105 in FIG. 1 is depicted as being bi-directional, it should be appreciated that the wireless client device 110 may exclusively either just transmit signals to or receive signals from the access point 105, such that the communications between them are essentially uni-directional. In an embodiment, all wireless client devices 110 use the same type of wireless signal to connect to the access point 105. In another embodiment, the wireless client devices 110 connect to the access point 105 using differing wireless signal types. In a further embodiment, the wireless client devices 110 use the most cost-effective wireless signal to connect to the access point 105.

Figure 2A:
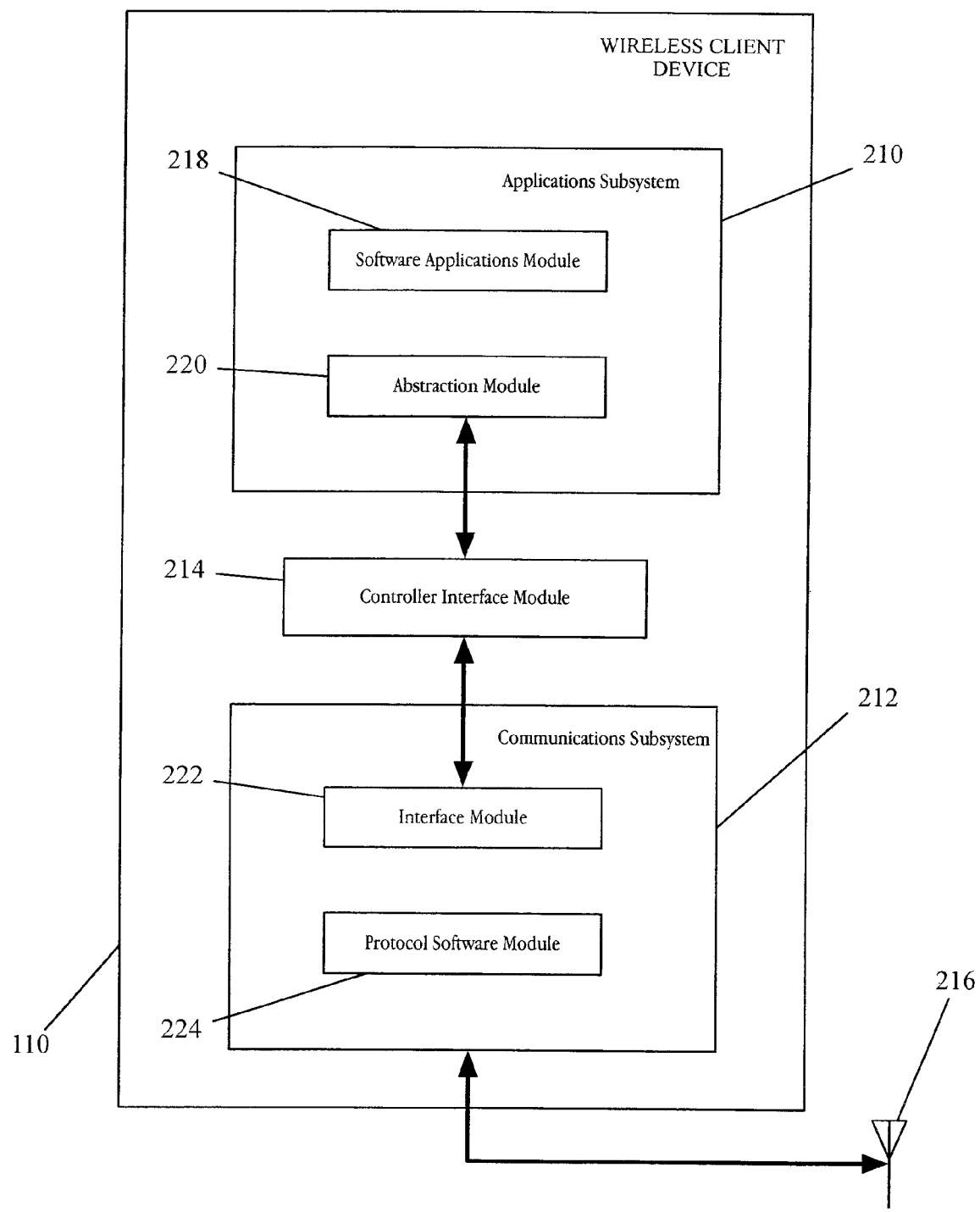
FIG. 2A is a high level block diagram of a system, such as that depicted in FIG. 1, according to embodiments of the present invention.

FIG. 2A is a high level block diagram of a system, such as that depicted in FIG. 1, according to embodiments of the present invention. In an embodiment, the system is a wireless client device 110, such as that described with respect to FIG. 1. The wireless client device 110 comprises two main subsystems, an applications subsystem 210 and a communications subsystem 212, operably coupled through a controller interface module 214. The communication subsystem 212 is further operably coupled to an antenna 216. Though drawn as external to the wireless client device 110, it will be understood by those skilled in the art that such antenna 216 may be integral to the wireless client device 110 in some embodiments.

In an embodiment, the applications subsystem 210 comprises a software applications module 218 and an abstraction module 220. In an embodiment, the software applications module 218 is capable of running user applications and an operating system. The operating system includes, without limitation, a full-featured operating system (FFOS). User applications include, without limitation, a multi-media interface (MMI). In an embodiment, the abstraction module 220 provides a programming interface to the application software module 218. In such an example, the abstraction module 220 is capable of converting program instructions received from the application software module 218 into instructions executable by the controller interface module 214. The abstraction module 220 receives network service requests from the software applications module 218, converts the network service requests into data signals configured to carry out the service request and transmits data signals to the controller interface module 214. Though drawn as separate functional block elements in FIG. 2A, it is understood that the software applications module 218 and the abstraction module 220 may be contained in a single module.

In an embodiment, the communications subsystem 212 comprises an interface module 222 and a protocol software module 224. In one embodiment, the protocol software module 224 is configured to receive signals from the interface module 222 and transmit those signals through the antenna 216 over a communications protocol to a network through a base station 105, as contemplated by FIG. 1. In an alternate embodiment, the protocol software module 224 is configured to send signals to another wireless client device. The interface module 222 is configured to receive signals from the controller interface module 214 and execute those signals. Though drawn as separate functional block elements in FIG. 2A, it is understood that the interface module 222 and the protocol software module 224 may be contained in a single module.

In an embodiment, the controller interface module 214 is separately coupled to the applications subsystem 210 and the communications subsystem 212. The controller interface module 214 is capable of receiving and sending signals to the application subsystem 210 and receiving and sending signals to the communications subsystem 212. In an embodiment, the controller interface module 214 is configured to send and receive more than one signal concurrently. In one embodiment, the signals received from the applications subsystem 210 are converted into signals executable by the communications subsystem 212. In another embodiment, the signals received from the communications subsystem 212 are converted into signals executable by the applications subsystem 210. In such an example the controller interface module 214 provides a common programming interface to the applications subsystem 210 and the communications subsystem 212. Integration of a separately manufactured applications subsystem 210 and a communications subsystem 212 is made easier as the applications subsystem 210 need only be configured to transmit signals executable by the controller interface module 214 and need not be configured to transmit signals executable by the communications subsystem 212. This has the advantage of allowing a systems manufacturer to quickly integrate disparate communications subsystems 212 into a manufacturing process without the need to reprogram the applications subsystem 210. Conversely, the use of a an applications subsystem 210 with improved user functionality need not require a reprogrammed communications subsystem 212, as the communications subsystem 212 need only be configured to send signals executable by the controller interface module 214.

In an embodiment, the controller interface module 214 is an application programming interface (API), the operations of which can be divided into four main functional groupings: requests, confirmations, indications and responses. In an embodiment, requests are used by the application subsystem 210 to request services; confirmations are used by the communications subsystem 212 to provide results to previous requests; indications are used by the communications subsystem 212 to report unsolicited events or information to the application subsystem 210; and responses are used by the application subsystem 212 to respond to earlier indications. In an embodiment, for each of these functional groupings, the controller interface module 214 defines a set of functional primitives, wherein each of the primitives performs a single function or service. Examples of such functions or services include, without limitation, cellular network registration, outgoing call initiation, delivery of an incoming Short Message Service (SMS) messages, setting up a packet-switched data connection, etc. In an embodiment, functional primitives are divided into three categories: core primitives that are required in every implementation of the controller interface module 214; extended primitives that are optionally implemented; and custom primitives that are specific to a particular controller interface module 214.

In an embodiment, the controller interface module 214 has one or more independent service groups accessible by one or more individual service clients of the applications subsystem. Service groups provide services including, without limitation, call control, mobility management, Subscriber Identity Module (SIM) Interface, supplementary services, messaging, packet-switched network services, circuit-switched/packet-switched data operations (send/receive), phonebook access, device-related services, etc. In one embodiment, more than one service client accesses a single service group. In another embodiment, a single service client accesses a single service group. In a further embodiment, a single service client accesses multiple service groups. In an embodiment, the individual service clients are configured to send a registration request for a particular service group to the controller interface module 214. In such an example, the service client will receive a handle which can be used for requesting a set of functions from the service group. In a further embodiment, the service client is configured to request access to services by providing the received handle and a identifier that is unique to the service group. In an embodiment, the controller interface module 214 is configured to maintain a mapping between the handles and the service groups.

In an embodiment, service groups may be divided into three categories, core, extended and custom. Core service groups are those service groups that are required by the controller interface module 214. Extended service groups are optional in the controller interface module 214. Custom service groups are specific to a particular implementation of the controller interface module 214. In an embodiment, the controller interface module 214 is configured to provide a common abstraction layer between an applications subsystem 210 and a communications subsystem 212 and implementation of service groups outside of the core service groups may result in some incompatibilities between application subsystems 210 and communication subsystems 212. Core service groups may include, without limitation: Call Control related group service group; Mobility Management related service group; and Device related service group. Extended service groups may include, without limitation: Supplementary Services related service group; Phonebook related service group; SIM Access related service group; Message Service related service group; Packet Switched related service group; High Speed CSD related service group; Data related service group; Debug related service group; AT Parser Interface service group; Position Location; and Operations, Administration and Maintenance (OA&M) related service group. In a further embodiment, the controller interface module 214 is configured to respond to a query by either the applications subsystem 210 or the communications subsystem 212 requesting which extended service groups are supported by the controller interface module 214.

Though depicted and described as separate and distinct functional elements in FIG. 2, it is to be understood that all elements may be combined into a single element without departing from the scope of the embodiments described herein.

In an embodiment of the wireless client device 110, the communications subsystem 212 is operably coupled to the antenna 216. The antenna 216 may include one or more of a patch, omni-directional, beam, monopole, dipole, and rhombic antenna, among others.

Figure 2B:
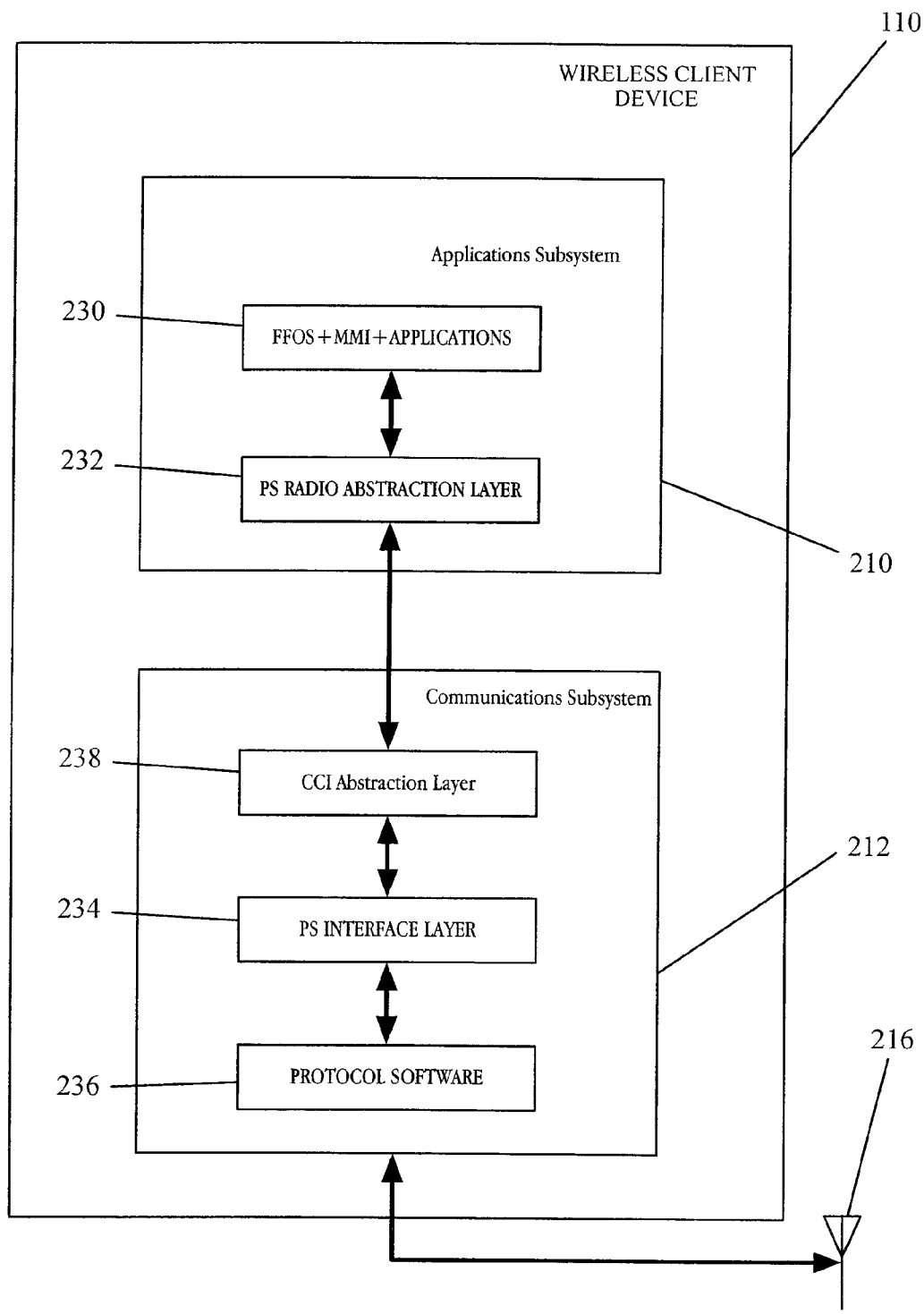
FIG. 2B is a more specific block diagram of a system, such as that depicted in FIG. 2A, according to embodiments of the present invention.

FIG. 2B is a more specific block diagram of a system, such as that depicted in FIG. 2A, according to embodiments of the present invention. FIG. 2B is an example implementation of a wireless client device 110 described with respect to FIG. 2A. In an embodiment, the applications subsystem 210 of the wireless client device 110 comprises an FFOS+MMI+Applications Module 230 and a PS Radio Abstraction Layer Module 232. In one embodiment, the FFOS+MMI+Applications Module 230 is configured to execute a full-featured operating system (FFOS), a multi-media interface (MMI) and user applications. In an embodiment, the PS Radio Abstraction Layer Module 232 is configured to abstract the operations of the protocol software from the operations of the FFOS+MMI+Applications Module 230. In an alternate embodiment, the PS Radio Abstraction Layer Module 232 is configured to abstract the operations of the communications subsystem 212 from the operations of the FFOS+MMI+Applications Module 230. In an embodiment, the communications subsystem 212 comprises a PS Interface Layer Module 234 and a Protocol Software Module 236. The communications subsystem further comprises a Cellular Controller Interface (CCI) Abstraction Layer Module 238. In an embodiment, the CCI Abstraction Layer Module 238 is one example implementation of a controller interface module 214 as described above with respect to FIG. 2A.

In an embodiment, the CCI Abstraction Layer Module is communicatively and separately coupled to the PS Radio Abstraction Layer Module 232 and the PS Interface Layer Module 234. The CCI Abstraction Layer Module 238 is configured to receive signals from the PS Radio Abstraction Layer Module 232 of the applications subsystem 210 and convert the signals into signals executable by the PS Interface Layer Module 234 of the communications subsystem 212. In an embodiment, the CCI Abstraction Layer 238 is embodied in the communications subsystem 212. As discussed above with respect to the controller interface module 214, of which the CCI Abstraction Layer Module 238 is one example implementation, the CCI Abstraction Layer Module 238 may be separate from the communications subsystem 212.

In an embodiment, the CCI Abstraction Layer Module 238 provides compatibility across multiple application subsystems and communication subsystems. The CCI Abstraction Layer Module 238 is independent of the runtime environment and is configured to interoperate with multiple disparate PS Interface Layer Modules 234. In an embodiment, the CCI Abstraction Layer Module 238 is independent of the application development environment as well as the wireless protocol stack implementation.

Figure 3A:
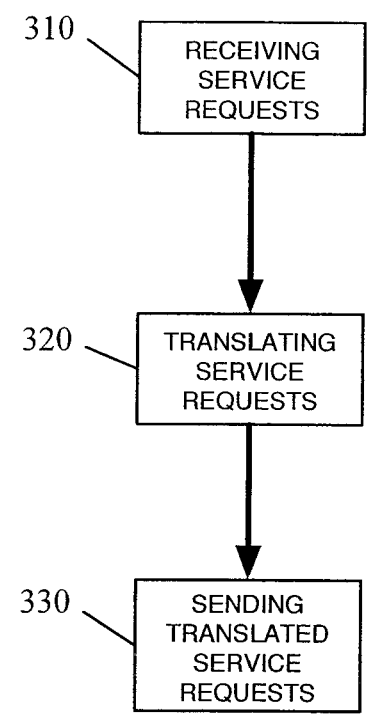
FIG. 3A is a flowchart of a method that could be carried out on a device, such as the device depicted in FIG. 2A, according to embodiments of the present invention.

FIG. 3A is a flowchart of a method that could be carried out on a device, such as the device depicted in FIG. 2A, according to embodiments of the present invention. At block 310, a service request is received by a controller interface module 214. At block 320, the received service request is translated into a form executable by an interface module 222, where such translation is performed by the controller interface module 214. The translated service request is sent to the interface module 222 of the communications subsystem at block 330. The translated service request is executed by the interface module 222. In an embodiment the service requests are received by the controller interface module 214 concurrently. In another embodiment, the translated service requests are sent concurrently to the interface module 222.

Though the term translated or translation is used, this is not meant to be limiting in any way. Translated in the context of the present application is meant to encompass any operation of receiving one set of program instructions from one module and manipulating those instructions in some manner to make those instructions executable by some other software module. In the present discussion, this allows for an abstraction of software modules so that the application subsystem 210 need only be programmed to interact with the controller interface module 214 and the communications subsystem 212 need only be programmed to interact with the controller interface module 214. In the absence of a controller interface module 214, as described herein, the application subsystem 210 would need to be programmed for every communications subsystem 212 that could be coupled to it. This increases manufacturing and programming complexity.

Figure 3B:
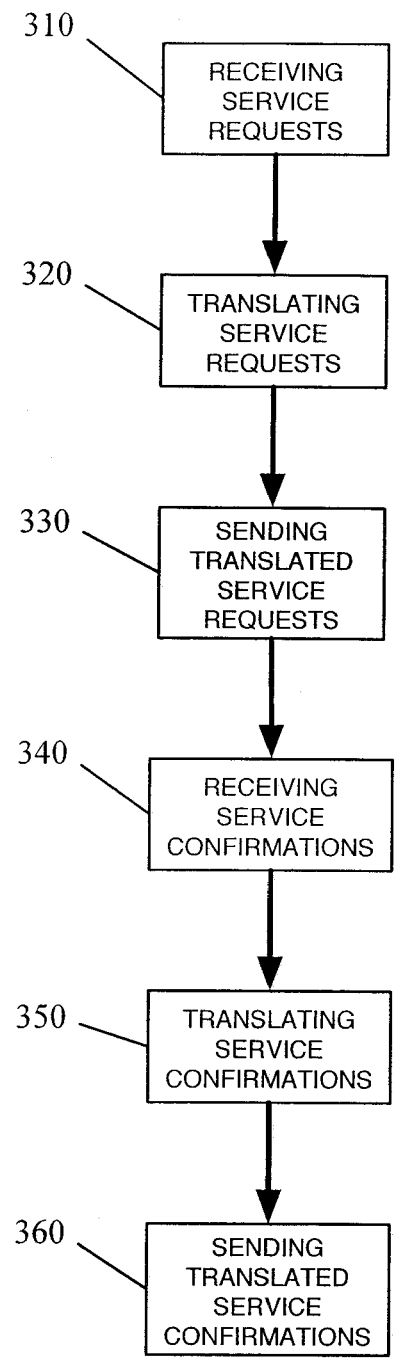
FIG. 3B is a flowchart of a method that could be carried out on a device, such as the device depicted in FIG. 2A, according to embodiments of the present invention.

FIG. 3B is a flowchart of a method that could be carried out on a device, such as the device depicted in FIG. 2A, according to embodiments of the present invention. FIG. 3B is similar to FIG. 3A with the addition of operations for the handling of the confirmation of the service request. At block 340, the service confirmation is received by the controller interface module 214 from the interface module 222. In an embodiment, a plurality of service confirmations are received concurrently by the controller interface module 214 at block 340. At block 350, the service confirmation is translated into a form executable by the abstraction module 220 of the applications subsystem 210. The translated service confirmation is sent to the abstraction module 220 at block 360, where further operations can be performed, such as operations by the FFOS+ MMI+Applications Module 230. In an embodiment, a plurality of translated service confirmations are sent concurrently to the abstraction module 220 at block 360.

Figure 4A:
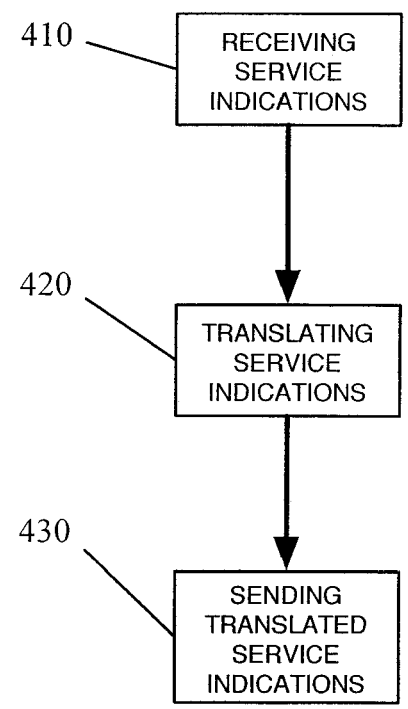
FIG. 4A is a flowchart of a method that could be carried out on a device, such as the device depicted in FIG. 2A, according to embodiments of the present invention.

FIG. 4A is a flowchart of a method that could be carried out on a device, such as the device depicted in FIG. 2A, according to embodiments of the present invention. At block 410, a service indication is received by the controller interface module 214 from the communications subsystem 212, and more particularly from the interface module 222 of the communications subsystem 212. As discussed above, a service indication is used by the communications subsystem 212 to report unsolicited events or information to the applications subsystem 212. These may include, without limitation, an indication of availability of service network, an incoming SMS message and the like. Operations on signals received by the communications subsystem 212 in response to requests made by the applications subsystem 210 are discussed above with respect to FIG. 3B. At block 420, the service indication is translated by the controller interface module 214 into a form executable by the applications subsystem 210. At block 430, that translated service indication is sent to the abstraction module 220 of the applications subsystem.

In an embodiment, at block 420 a service indication is translated by the controller interface module 214 into a plurality of service indications, at least one of which is in a form executable by the applications subsystem 210. Such operations may be required, for example, if the received service indication is one of network unavailability. Multiple service groups may require notification of such a condition and translating the single service indication into a plurality of service indications for each service client would be very advantageous.

Figure 4B:
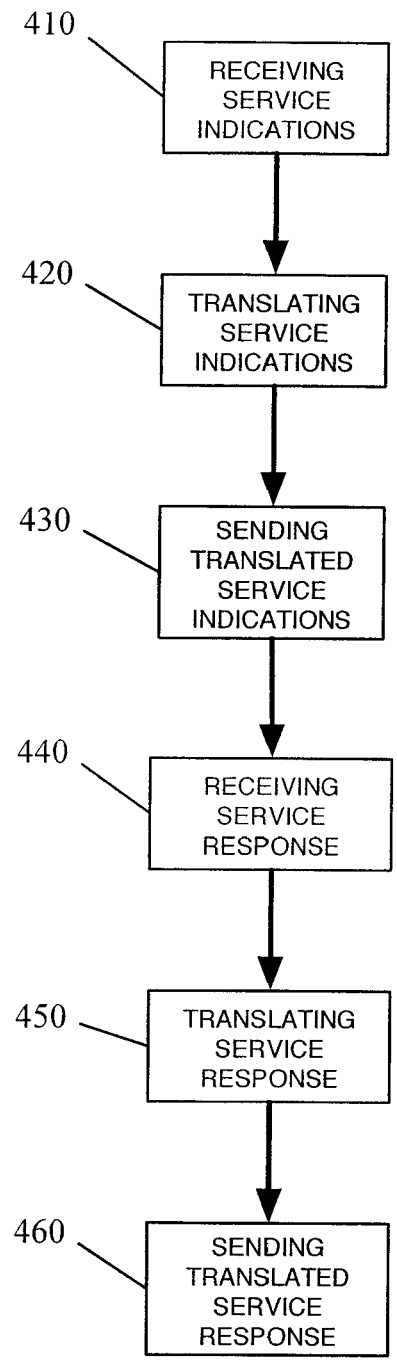
FIG. 4B is a flowchart of a method that could be carried out on a device, such as the device depicted in FIG. 2A, according to embodiments of the present invention.

FIG. 4B is a flowchart of a method that could be carried out on a device, such as the device depicted in FIG. 2A, according to embodiments of the present invention. FIG. 4B is similar to FIG. 4A with the addition of operations in response to the service indication. At block 440, a service response is received by the controller interface module 214 from the applications subsystem 210, and more particularly, by the abstraction module 220 of the applications subsystem 210. The service response is translated at block 450 by the controller interface module 214 into a form executable by the communications subsystem 212, and more particularly, by the interface module 222 of the communications subsystem 212. At block 460 the controller interface module 214 sends the translated service response to the communications subsystem 212, and more particularly, to the interface module 222 of the communications subsystem 212.

Figure 5A:
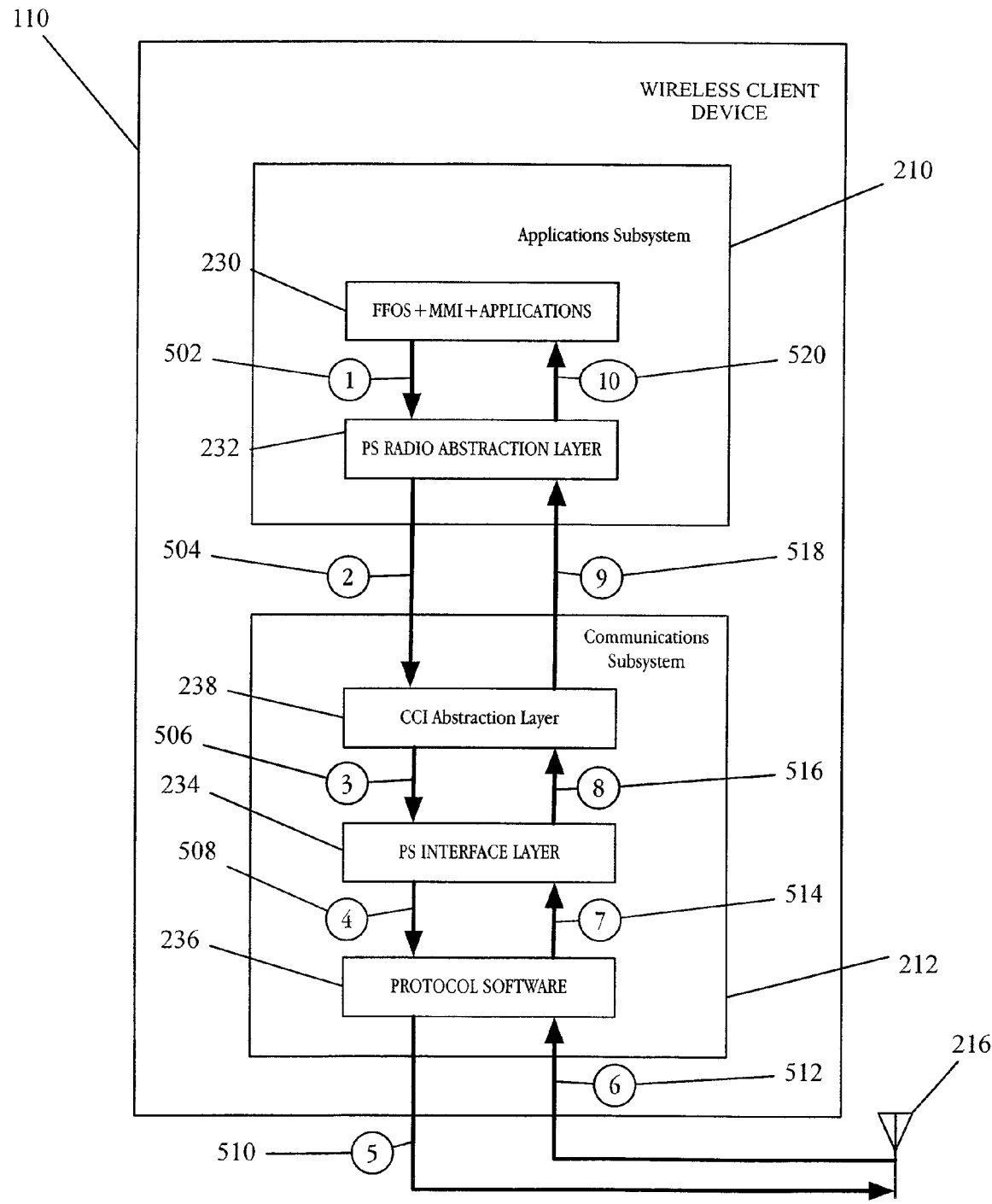
FIG. 5A is a dataflow diagram showing one example of dataflow in a device, such as the device depicted in FIG. 2B, according to embodiments of the present invention.

FIG. 5A is a dataflow diagram showing one example of dataflow in a device, such as the device depicted in FIG. 2B, according to embodiments of the present invention. FIG. 5A depicts exemplary dataflow in a wireless client device 110 such as described in FIG. 2B and carrying out the methods depicted in FIG. 3A and FIG. 3B. In the example of FIG. 5A, a user application requires some network resources, such as email or to initiate a phone call. The FFOS+MMI+Applications Module 230 sends the requirement 502 to the PS Radio Abstraction Layer Module 232. The PS Radio Abstraction Layer Module 232 formats the requirement as a service request and sends the service request 504 to the CCI Abstraction Layer Module 238 of the communications subsystem 212. The CCI Abstraction Layer Module 238 translates the service request into a form executable by the communications subsystem 212, and more particularly, the PS Interface Layer Module 234. The CCI Abstraction Layer Module 238 sends the translated service request 506 to the PS Interface Layer Module 234. The PS Interface Layer Module 234 executes the request and sends an appropriate command to the Protocol Software Module 236 which utilizes a suitable communications protocol to transmit the request 510 to the communications network accessible through the antenna 216.

In this example, the request will generate some reply from the communications network. This may be in the form of web content or a completed phone connection. The response is received by the antenna 216, which is then sent as a signal 512 to the Protocol Software Module 236. The Protocol Software Module 236 sends a signal containing the response 514 to the PS Interface Layer Module 234, which then formats a service confirmation and sends the service confirmation 516 to the CCI Abstraction Layer Module 238. The CCI Abstraction Layer Module 238 translates the service confirmation into a form executable by the applications subsystem 210, and more particularly, the PS Radio Abstraction Layer Module 232 of the Applications Subsystem 210. The CCI Abstraction Layer Module 238 sends the translated service confirmation 518 to the PS Radio Abstraction Layer 232 which then executes the service confirmation and sends a signal to the FFOS+MMI+ Applications Module 230. In an embodiment, this causes the FFOS+MMI+Applications Module 230 to perform operations responsive to the service confirmation, such as displaying the web content.

Though depicted as being initiated by the Applications Subsystem 210, there may be instances where a network communication institutes some operations on the Applications Subsystem 210. An example of such operation is an incoming phone call. Such an operation would cause dataflow to be the reverse of that depicted in FIG. 5A and described above. In an embodiment, operations in the reverse of that depicted in FIG. 5A proceed similarly to those described above and the depiction of only the initiation of network resources by the applications subsystem 210 is not meant to be limiting in any manner.

Figure 5B:
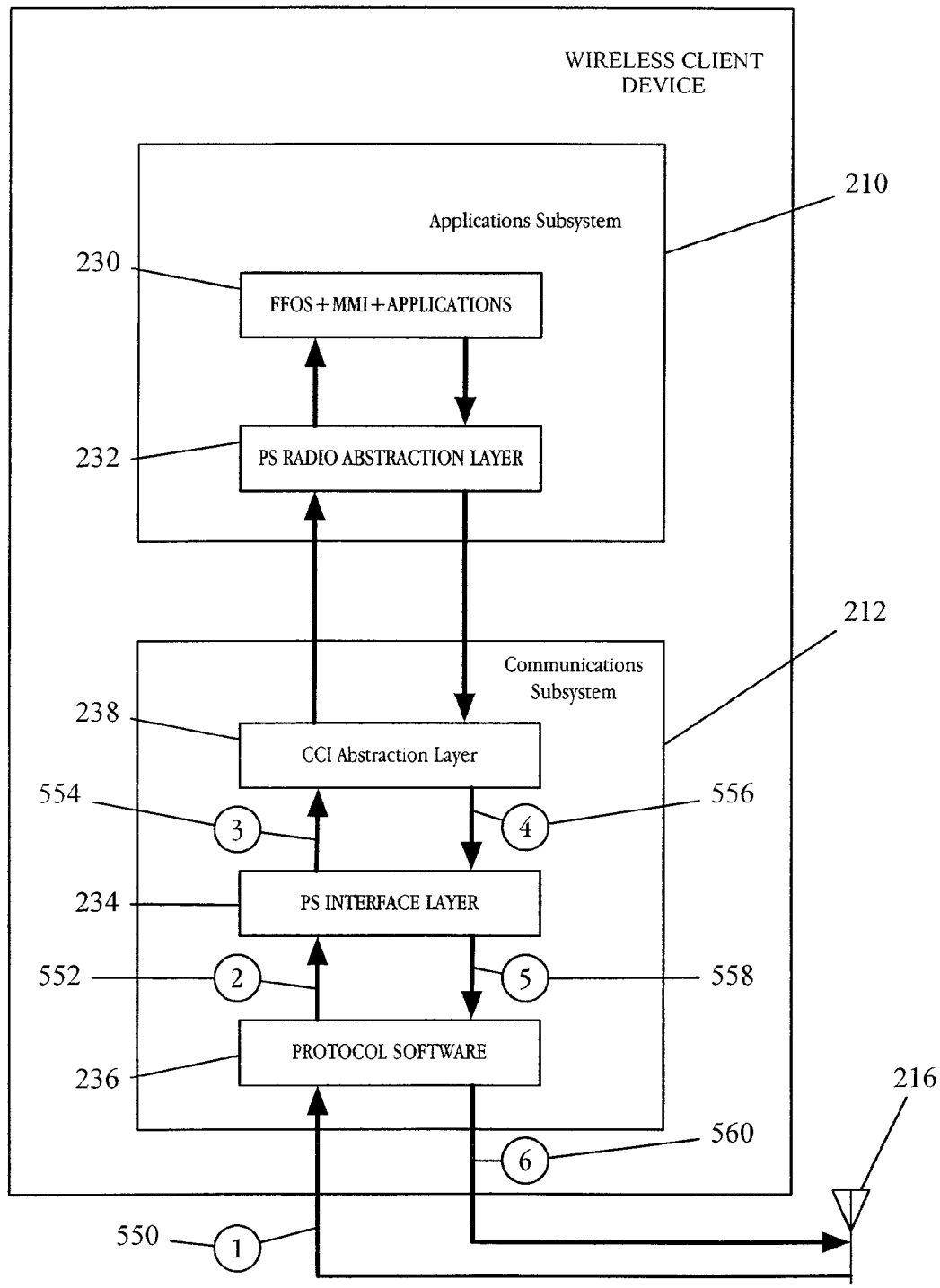
FIG. 5B is a dataflow diagram showing one example of dataflow in a device, such as the device depicted in FIG. 2B, according to embodiments of the present invention.

FIG. 5B is a dataflow diagram showing one example of dataflow in a device, such as the device depicted in FIG. 2B, according to embodiments of the present invention. FIG. 5B depicts dataflow in a wireless client device such as that described in FIG. 2A and carrying out the methods depicted in FIG. 4A and FIG. 4B. In the example of FIG. 5B, an unsolicited event, unsolicited information, or a network signal, is received from the communications network. The network signal 550 is sent to Protocol Software Module 236, which sends the signal 552 to the PS Interface Layer Module 234. The PS Interface Layer Module 234 formats the signal as a service indication and sends the service indication 554 to the CCI Abstraction Layer Module 238. In one example, this is the end of operations, such as a network ready indication. The CCI Abstraction Layer 238 can handle any interdepencies directly, without impacting the Application Subsystem 210 directly. In another example, the CCI Abstraction Layer 238 responds with a service response 556, which is then executed by the PS Interface Layer Module 558, received as a signal 558 by the Protocol Software Module 236 and sent as a network communications 560 through the antenna 216. In some instances, the CCI Abstraction Layer 238 in the above example may send a signal to the PS Radio Abstraction Layer Module 232, notifying the Applications Subsystem 210 of some current condition.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments of the invention. Combinations of the above embodiments and other embodiments not specifically described herein will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. Additionally, in the foregoing Detailed Description, it can be seen that various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

What is claimed is:

1. A system comprising:
   a communications subsystem including an interface module and a protocol module, the communications subsystem being coupled to an antenna;
   an applications subsystem including a software applications module and an abstraction module, the software applications module to execute an operating system and user applications, the abstraction module to provide an interface with the software applications module; and
   a controller interface module that is a separate component from either the communications subsystem or the applications subsystem and that is communicatively coupled to both the abstraction module and the interface module, the controller interface module to convert data signals from the applications subsystem into signals that are executable by the communications subsystem, the communications subsystem to receive communications from the applications subsystem only after being transmitted through and translated by the control interface module, the application subsystem and the communications subsystem each to transmit signals executable by the controller interface module, the interface module is to format a second signal corresponding to an unsolicited communications network event received by the protocol software module into a service indication and wherein the controller interface module further translates the service indication received from the interface module into a form executable by the abstraction module, the controller interface module further having a service group accessible to the application subsystem through which packet-switched or circuit-switched data is sent and received between the applications subsystem and the communications subsystem.

2. The system of claim 1, wherein the communications subsystem and the applications subsystem interact with each other only through the controller interface module.

3. The system of claim 1, wherein the controller interface module includes an application programming interface.

4. The system of claim 1, wherein the abstraction module is to convert a network resource requirement of the software applications module into instructions executable by the controller interface module to carry out a network service request.

5. The system of claim 4, wherein the controller interface module is to translate the instructions received from the abstraction module into a form executable by the interface module.

6. The system of claim 1, wherein the controller interface module is to concurrently receive a plurality of service requests from the abstraction module and to concurrently send a plurality of corresponding service confirmations to the abstraction module.

7. The system of claim 6, wherein the controller interface module is to translate the plurality of service requests into a form executable by the interface module.

8. A wireless client device, comprising:
   an applications subsystem including a software applications module to execute an operating system application and user applications on the wireless client device, and an abstraction module to provide a programming interface with the software applications module;
   a communications subsystem, the communications subsystem including an antenna, a protocol software module electrically coupled to the antenna, and an interface module to send signals to and receive signals from the protocol software module; and
   a controller interface module coupled to the applications subsystem and the communications subsystem to provide a common translation interface to allow data interactions therebetween, the controller interface module being a separate component from either the communications subsystem or the applications subsystem, the communications subsystem to receive communications from the applications subsystem only after being transmitted through and translated by the controller interface module, the interface module is to format a second signal corresponding to an unsolicited communications network event received by the protocol software module into a service indication and wherein the controller interface module further translates the service indication received from the interface module into a form executable by the abstraction module.

9. The wireless client device of claim 8, wherein the controller interface module is to convert signals from the applications subsystem into signals executable by the communications subsystem.

10. The wireless client device of claim 8, wherein the controller interface module has a service group to process data moving between the applications subsystem and the communications subsystem, the applications subsystem and the communications subsystem each being configured to transmit signals executable by the controller interface module.

11. The wireless client device of claim 8, wherein the interface module sends a command to the protocol software module in response to executing a translated network service request received from the controller interface module.

12. The wireless client device of claim 11, wherein the protocol software module is configured to utilize a communications protocol to transmit the translated network service request to a communication network accessible to the wireless client device through the antenna in response to the command received from the interface module.

13. A wireless client device, comprising:
- an applications subsystem including an applications module to execute an operating system application and user applications on the wireless client device, and a radio abstraction module to abstract protocol operations received from the applications module;
- a communications subsystem including an antenna, and a protocol software module electrically coupled to send signals to and receive signals from the antenna; and
- a controller interface module that is a separate component from either the communications subsystem or the applications subsystem and that is communicatively coupled to both the applications subsystem and the communications subsystem to convert data signals from the applications subsystem into signals that are executable by the communications subsystem, the communications subsystem to receive communications from the applications subsystem only after being transmitted through and translated by the controller interface module, the interface module is to format a second signal corresponding to an unsolicited communications network event received by the protocol software module into a service indication and wherein the controller interface module further translates the service indication received from the interface module into a form executable by the radio abstraction module.

14. The wireless client device of claim 13, wherein the applications subsystem further includes a multi-media interface.

15. The wireless client device of claim 13, wherein the abstraction module comprises a cellular controller interface.

16. The wireless client device of claim 13, further comprising a protocol software interface module coupled to the abstraction module and the protocol software module.

\* \* \* \* \*